Oct. 19, 1965

M. M. HANN 3,212,263

HYDROSTATIC TRANSMISSION

Filed April 24, 1964

Inventor:
Melvin M. Hann
By
Hofgren, Wegner,
Allen, Stellman & McCord
Attys

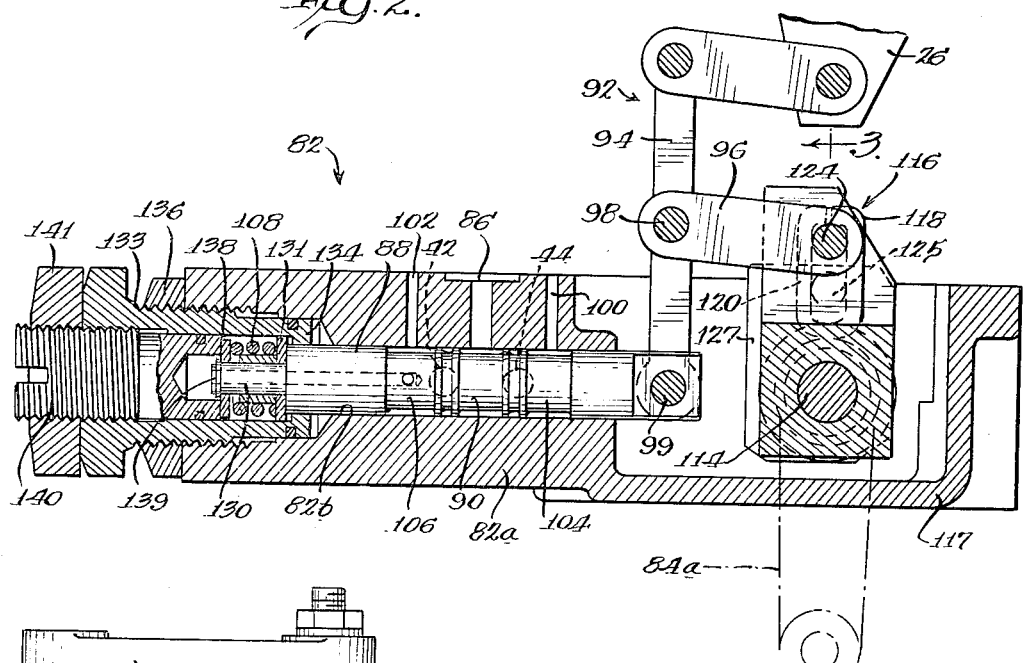
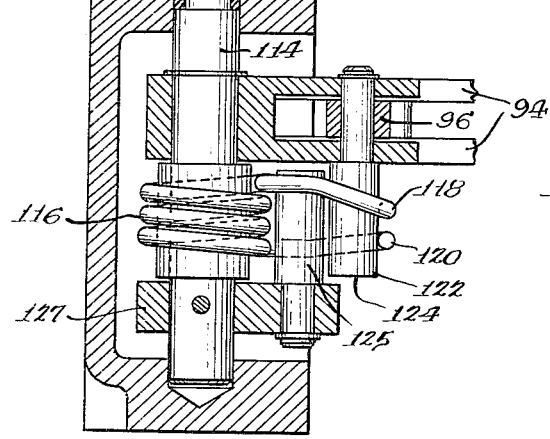

United States Patent Office 3,212,263
Patented Oct. 19, 1965

3,212,263
HYDROSTATIC TRANSMISSION
Melvin M. Hann, Rockford, Ill., assignor to Sundstrand Corporation, a corporation of Illinois
Filed Apr. 24, 1964, Ser. No. 362,257
20 Claims. (Cl. 60—53)

This invention relates to hydrostatic transmissions and more particularly to a control means therefor.

Slow moving, hard working vehicles, such as tractors, road graders and the like, use hydrostatic transmissions for supplying the power from the prime mover to the wheels of the vehicle. General control of the hydrostatic transmission may be accomplished through relatively small valves which are typically positioned in response to manual movement of a control handle by the driver of a vehicle. It is sometimes the case that, when the aforementioned types of vehicles encounter excessive load or difficult traction or the like, the vehicle operator tends to violently or forcefully move the control handle which is connected to such valves. Since the valves used are generally less resistant to violent or forceful motion than other components of the vehicle, such action might cause damage to the valve and therefore cause malfunctioning or inoperativeness in the hydraulic system which serves the hydrostatic transmission. Thus, it is desirable to provide means by which the violent or forceful manual control movement may be sufficiently attenuated to eliminate the possibility of damage to the valve member being positioned by movement of the control handle.

It is therefore a primary object of this invention to provide a new and improved control means for a hydrostatic transmission.

It is another object of this invention to provide a new and improved control means for a hydrostatic transmission which is free from the objections mentioned above.

It is still another object of this invention to provide a new and improved control means for a hydrostatic transmission having a manually operable handle for positioning a control valve therein with the handle being yieldably connected to the control valve so that violent or forceful motion imparted to the handle may be attenuated while being transmitted to the valve member.

Another object is to provide a new and improved hydrostatic transmission with an axial piston pump having a swashplate inclinable in opposite directions from a neutral center position, hydraulic means for varying the swashplate angle to vary the displacement, a control valve for the displacement varying means, manual valve operating handle means, and resilient means intervening the valve and handle to prevent damage to the valve.

A further object is to provide a new and improved hydrostatic transmission with spring means for normally centering the pump swashplate in a neutral position.

It is also an object of this invention to provide a hydrostatic transmission of the character mentioned including resilient spring means for centering the displacement control valve.

An additional object is to provide a new and improved hydrostatic transmission with servo means providing a power assist for adjusting a variable angle swashplate, together with means for returning the swashplate to neutral without power assist in the event the prime mover is stalled, in order to unload the prime mover during restarting.

Further objects and advantages will become apparent from the following detailed description taken in connection with the accompanying drawings, in which:

FIG. 2 is an enlarged sectional view of the valve member of this invention; and

FIG. 3 is an enlarged sectional view of the control handle means of this invention.

Figure 1:
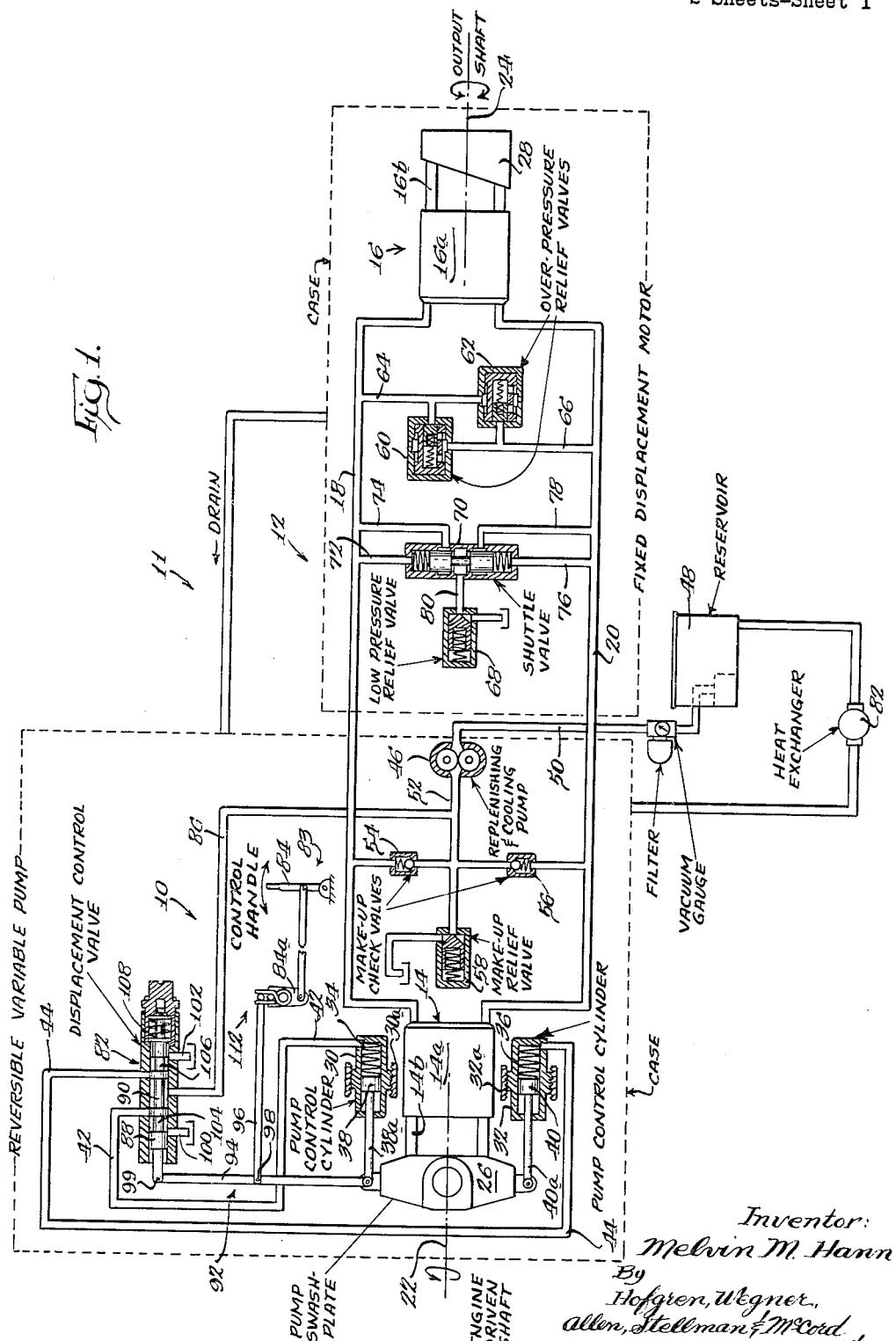
FIG. 1 is a diagrammatic illustration of a hydrostatic transmission embodying the principles of this invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, the control means 10 of this invention is shown in use with a hydrostatic transmission 11 including a closed hydraulic circuit 12 having an engine driven pump 14 and a motor 16 supplied by the pump. The pump and motor are hydraulically connected by conduits 18 and 20 to establish a closed transmission circuit for pumping the hydraulic fluid from the pump 14 to the motor 16. The drive output of an engine (not shown) is transmitted to the pump through a suitable shaft represented diagrammatically at 22. The output of the motor is transmitted to the driving wheels or tracks of the vehicle by means of a suitable shaft represented diagrammatically at 24.

Preferably both the pump and motor are of an axial piston type having rotatable cylinder blocks 14a and 16a, respectively, each with a plurality of cylinders in annular array and reciprocal pistons 14b and 16b, respectively, having ends reciprocating in the cylinders. The pump 14 has a variable angle reversible swashplate 26 engaged by projecting ends of pistons 14b for controlling the speed of the transmission as well as the direction thereof. The motor has a fixed displacement inclined cam plate 28 engaged by the pistons 16b.

For positioning the pump swashplate, two pump control cylinders 30 and 32 are provided. The pump control cylinders 30 and 32 house centering springs 34 and 36, respectively, and include pistons 38 and 40 on rods 38a and 40a, respectively, which are pivotally secured to the swashplate for positioning the same in response to supply of control fluid to the cylinders by means of conduits 42 and 44, respectively. The springs normally act through the pistons to position the pump swashplate as shown in FIG. 1 in a position of minimum displacement so that there is no positive output from the pump and the cylinders are adjustably threadably mounted as at 30a and 32a for longitudinal movement to properly compress the springs and assure exact neutral. The control cylinders are a conventional single action type so that the influx of fluid under pressure in one cylinder will cause the swashplate to tilt or pivot in a given direction and the influx of fluid under pressure in the opposite cylinder will cause the reverse tilting so that movement in opposite directions may be imparted to the motor and thus to the vehicle being driven thereby.

A positive displacement gear-type replenishing and cooling pump 46 is provided and is driven by suitable means by the engine or prime mover for this transmission. The replenishing and cooling pump is in communication with a reservoir 48 through an intake conduit 50 for supplying replenishing and cooling fluid to the system through the replenishing and cooling conduit 52. The capacity of the pump is sufficient to replace leakage fluid, to supply control fluid to the valve and to supply cooling fluid to the circuit in excess of that required for the aforementioned purposes in order to maintain the transmission cool.

A pair of spring biased check valves 54 and 56 are in communication with the conduit 52 and with the conduits 18 and 20, respectively, for supplying the replenishing and cooling fluid to the low pressure side of the circuit through one check valve while pressure in the high pressure conduit will maintain the other check valve closed. A spring biased make-up relief valve 58 communicates with the conduit 52 and serves to relieve excess fluid.

For establishing a circuit between the main line 18 or 20 that is at low pressure and a low pressure relief valve 68, a shuttle valve 70 is provided. The shuttle valve is in communication with the conduits 18 and 20 by means of the conduits 72, 74 and 76, 78, and provides a means for removing heated oil displaced by cooling oil supplied by replenishing pump 46. The fluid pressure in the conduits 18 and 20 acts through conduits 72 and 76, respectively, to appropriately position the shuttle valve so that communication is established from the low pressure relief valve through a conduit 80 to the low pressure side of the transmission circuit, by means of either the conduit 74 or the conduit 78 so that the heated fluid may be drained to the reservoir therefrom, passing through the heat exchanger 82. Shuttle valve 70 is spring centered to a closed position so that during the transition of reversing of pressure in the main lines none of the high pressure oil is lost from the circuit.

The transmission includes overpressure relief valves 60 and 62 in communication with each of the main conduit lines by means of the conduits 64 and 66, respectively. The valves serve to prevent abnormally high pressure in either of the two main hydraulic lines 18 and 20 by relieving the circuit of surge pressures which may occur during rapid acceleration or abrupt braking. In response to this high pressure, the overpressure valves shift to dump the excess oil to the low pressure side of the transmission circuit. For example, when high pressure exists in line 18, then fluid through conduit 64 will cause valve 60 to shift to shunt the fluid to line 20 through conduit 66.

The control unit of this invention includes a displacement control valve 82 and control handle assembly 83 having a control handle 84 for appropriately positioning the control valve. The control handle assembly is provided with conventional frictional retention means for maintaining the handle in any preselected position to which it is manually moved. The control valve is a spring centered four-way valve in communication with control fluid by means of the conduit 86. The valve includes a valve stem 88 having reduced diameter portions such as 90. The valve stem is operatively associated with the control handle through linkage means 92. Linkage means 92 includes a valve-to-swashplate link 94 which is pivoted at one end to the valve stem 88 and pivoted at the other end to the swashplate 26. Intermediate the aforementioned pivotal securements, a control handle link 96 is pivotally secured to the link 94 at 98 so that movement of the control handle will appropriately position the valve stem for appropriate metering of fluid through the valve.

As shown in FIG. 2, control valve 82 is in a neutral or centered position so that control fluid from the pump by way of conduit 86 enters the valve, and while capable of flowing past the reduced diameter portion 90 of the valve stem 88, it is blocked by lands of stem 88 from passing out of the valve through either the conduit 42 or 44 so that no fluid may be supplied to the pump control cylinders. However, the conduits 42 and 44 from the pump control cylinders are in communication with drain conduits 100 and 102 by way of the valve stem reduced portions 104 and 106, respectively.

Movement of the control handle 84 imparts the desired directional movement to the vehicle. If, for example, the control handle is moved to the left as shown in FIG. 1, the link 96 will also move to the left thereby moving the valve stem 88 to the left as the link 94 pivots about the end of the swashplate. The control handle is provided with suitable friction means so that it is retained in selected positions. As the valve stem moves to the left, communication is established around the reduced portion 90 between the conduit 86 and the conduit 42 supplying control fluid to the pump control cylinder 30 causing the pump swashplate to pivot in a counterclockwise direction.

The pump control cylinder 32 is still connected to drain 102 through the conduit 44 and reduced portion 106.

As the swashplate tilts in a counterclockwise direction, the link 94 pivots clockwise about the point 98 because the link 96 is stationary due to the frictional retention of the control handle 84 in the selected position. Movement of swashplate 26 creates a feedback signal to valve 82. That is, pivoting of the link 94 about the point 98 causes the valve stem 88 to be moved to the right, toward the original neutral position. However, as the valve stem moves to the right the flow of control fluid to cylinder 30 will be blocked by the valve stem thus shutting off the supply of additional control fluid to the pump control cylinder 30. The termination of the supply of control fluid to the cylinder also terminates the further movement of the swashplate thereby halting further movement of the valve stem. Thus, the valve achieves a closed position blocking the flow of control fluid to or from the control cylinder which is acting to displace the swashplate so that further swashplate displacement in either direction is prevented. Handle 84 remains in the position to which it has been moved until it is moved again by the operator. If the swashplate overshoots, the feedback signal to the valve calls for adjustment of the swashplate to correctly position it. Upon returning control handle 84 to neutral, valve stem 88 is moved so that communication is established between the conduit 42 and drain conduit 100 by the reduced portion 104, draining the control fluid from the cylinder 30 while control fluid is supplied to cylinder 32 through reduced portion 90 to return the swashplate to an upright or neutral position as shown in FIG. 1.

The connection of the control handle to the link 96 is illustrated in further detail in FIG. 3. It is to be noted that there is a yieldable connection between the control handle and the valve member so that excess forces applied to the control handle will not be transmitted to the valve member. In particular, the yieldable connection indicated generally at 112 is between the control handle and the linkage 96 for moving the valve member. The control handle 84 is adapted to be suitably connected to a control arm 84a secured to one end of a control shaft 114. The shaft 114 has concentrically mounted thereon a coiled torsion spring 116 having outwardly projecting terminal fingers 118 and 120 at opposite ends thereof which tend to move toward each other but may be moved apart. Shaft 114 is pivotally mounted in a bracket extension 117 of valve housing 82a. The fingers 118 and 120 are offset axially from each other as well as being spaced relative to each other circumferentially, and a pair of pins 124 and 125 are positioned therebetween. Pin 124 is secured in the link 96 and in an arm 96a free on shaft 114, and pin 125 is secured in bracket 127 which is pinned to shaft 114. As the valve control handle 84 is moved, the shaft 114 will be turned and pin 125 will bear against either the finger 118 or 120. The other finger of spring 116 will resiliently urge against the pin 124 for moving the link 96 in the desired direction. Normally, the spring transmits motion as a rigid member.

The torsion of the spring is such that the handle 84 is moved sufficiently to jam the valve stem 88 to the limit of its permissible movement; the spring 116 will yield in response to the opposition offered by the valve stem so that the handle movement is not transmitted directly to the valve member. Thus, rather than permit the excess of force to be transmitted to the valve stem where it may cause damage thereto, such excess force is absorbed in the spring 116.

Referring to FIG. 2, it should be noted that the valve body 82a has a main valve bore 82b and a counterbore at the left end to facilitate assembly of the valve apparatus. Valve stem 88 has a reduced end portion 130, and a collar 131 is slidably mounted on the reduced portion and adapted to abut the shoulder between the reduced portion 130 and the main valve stem 88. In assembly, the valve stem 88 is positioned in the valve bore 82b, after which a valve sleeve 133 is threadably inserted into the valve counterbore with a terminal portion 134 slidably receiving the valve stem 88. The threaded member 133 is preferably locked into position by a lock nut 136.

The collar 131 on the reduced stem portion 130 provides a spring seat against which one end of the coiled compression spring 108 bears. The other end of the spring bears against a spring seat 138 in the form of a washer or collar retained on the reduced stem portion 130 as by a snap ring 139. The spring seat 138 is normally abutted by a stop 140 threadably adjustable in sleeve member 133 and preferably held by lock nut 141.

In operation, if the valve member 88 is moved to the left as viewed in FIG. 2, the spring seat 138 engages stop 140 so that spring 108 is compressed as the seat 131 moves to the left in contact with the shoulder on the valve stem. If the valve stem is moved toward the right, the spring seat 131 engages the inner annular shoulder on the terminal portion 134 of sleeve 133, so that the spring is compressed as the seat 138 moves toward the right.

The valve stem movement in opposite directions from the neutral center position illustrated is terminated when the spring 108 is fully compressed and is obviously quite limited.

Since the movement is very short and the valve need not be large, the construction may be regarded as relatively fragile and therefore subject to damage unless protection is afforded as by the resilient connection 116 between the operator's handle and the valve stem.

Other important advantages are provided by the construction described herein. More specifically, the problem of obtaining a pure stop position in a hydrostatic transmission utilizing efficient positive displacement elements is a difficult problem nicely overcome in the transmission of this invention. More specifically, in order to obtain a positive neutral position of the pump swashplate, the centering springs 34 and 36 in the cylinders 30 and 32 insure return of the pump swashplate to neutral when the control valve handle 84 is returned to neutral. Threadable adjustment of the cylinders 30 and 32 provides for proper compression of the centering springs and adjustment to insure placement of the swashplate in the exact neutral position.

In addition to the positively centered swashplate, the displacement control valve is spring centered by means of spring 108, and the spring is preferably designed with sufficient strength to pull the backlash out of the operator's control linkage when the handle is moved to neutral. It should be understood that the valve operating linkage illustrated in FIGS. 2 and 3 will normally be located rather closely adjacent the pump swashplate, while in many instances the manually accessible control handle 84 may be rather remotely situated in order to be closely available to an operator's stand. Thus, there will be additional linkage not shown in FIGS. 2 and 3 provided for purposes of interconnecting the arm 84a and the handle 84, as diagrammatically illustrated in FIG. 1.

It is inherent in any such linkage apparatus that there will be backlash or errors due, for example, to manufacturing tolerances and in some cases to wear. When the control handle is initially moved to start the transmission, the backlash is taken up, so to speak, but upon returning the handle to the specified neutral position, the valve stem 88 might not necessarily be returned to exact neutral because of backlash, but the centering spring 108 in the valve assures return of the valve to neutral in spite of backlash.

Another advantage of the present control is in the provision for return of the pump swashplate to neutral by the spring means 34 without power assist in the event of an engine shutdown or stall with the pump in stroke. Simply by returning the control valve 82 to neutral, control cylinder 30 or 32 is exhausted, and the opposing spring centers the swashplate. The transmission load is thus removed from the engine or other prime mover as it is restarted, in contrast to most power assist servo systems, where power assist would be required to return the pump to neutral.

Conduit 86 may be restricted to control the rate of movement in the control cylinders thereby to limit the maximum rate of vehicle acceleration and deceleration.

In some installations it may be desirable not to frictionally retard the handle so that the transmission goes to neutral when the handle is released. Under such circumstances, if the handle is moved rapidly toward neutral for purposes of slowing the transmission, the vehicle propelled may have such momentum as to drive the motor 16 as a pump, whereupon the pump 14 may be driven as a motor. During operation of the pump in a motoring attitude, during a braking or slowing condition, the speed with which the pump swashplate is returned to neutral may be controlled by preselection of the strength of the swashplate centering springs 34 and 36, and the latter may be such as to provide an automatic smooth deceleration when desired, whereas abrupt braking may be obtained by reversing the control valve.

It should also be noted that any internal pressures resulting from change in load on output shaft 24 which tend to pivot the swashplate toward increased or decreased displacement due to decrease or increase in load, such as the piston inertia moment or fluid pressure moment, will trigger a feedback reaction through link 94 to valve 82 to supply fluid as required for varying swashplate 26 in a direction opposing such internal force so that output speed in shaft 24 is maintained constant and in conformity with speed setting of handle 84.

While the controls of this invention have been illustrated as applied to a variable swashplate pump, it should be understood that one or more aspects of the invention may be utilized in controlling the variable swashplate motor or the like in a system such as a hydrostatic transmission.

I claim:
1. In a hydrostatic transmission, a pump unit, a motor unit supplied by said pump, servo means for varying the displacement of one unit away from a neutral or minimum displacement position in two directions and return for reversible and variable transmission output, single lever means selectively movable from a neutral position in either of two directions for varying displacement, control means for said servo means movable in two directions from a neutral position to limit positions and return for actuating said servo means to correspondingly vary the displacement in two directions from minimum displacement and return, and normally rigid resilient means linking said control means and lever for normally moving said control means in each direction of movement with said lever an amount sufficient to actuate said servo means, said lever being movable over an extended range beyond the amount of movement away from neutral in either direction necessary to actuate said servo means to said limit positions, and said resilient means being yieldable upon movement of said lever in said extended range to avoid damaging the control means.

2. In a hydrostatic transmission, a pump unit, a motor unit, conduit means connecting the pump and the motor so that the former supplies fluid to drive the latter, fluid operable means for varying the displacement of one of the units to vary the output of the motor, means providing a source of control fluid under pressure, valve means controlling the flow of control fluid relative to said displacement varying means including a valve member movable from a neutral position in a direction to cause operation of said displacement varying means, stop means limiting movement of the valve member in opposite directions, a manually accessible control member movable from a neutral position in a direction to operate said valve means, and a normally rigid link connecting said manually accessible control member and said valve member and yieldable upon movement of said manually accessible control member in excess of movement required to move said valve member to said stop means thereby to avoid damage to the valve means.

3. In a hydrostatic transmission, a pump having a swashplate, a motor, conduit means connecting the pump outlet with the motor inlet and the motor outlet with the pump inlet so that the pump delivers fluid to drive the motor and the motor returns fluid to the pump, fluid operable means for varying the angle of the pump swashplate in opposite directions from a neutral center position thereby to vary the transmission output, valve means controlling the flow of fluid relative to the fluid operable means including a valve member movable in opposite directions from a neutral center position for porting fluid to operate the displacement varying means in opposite directions, stop means defining opposite extremes of valve member movement and limiting movement of the valve member therebeyond, a manual control handle for operating the valve means and movable in opposite directions from a neutral center position, linkage means interconnecting the manual handle and the valve member to move the valve member proportionately with handle movement including normally rigid resilient means yieldable upon movement of said handle beyond a position sufficient to engage the valve member with the stop means.

4. A combination as in claim 3, including spring means biasing the pump swashplate to neutral position when said valve member is in neutral position.

5. A combination as in claim 3, including spring means biasing said valve member to neutral position.

6. A combination as in claim 3, wherein said valve member in neutral position connects both sides of said fluid operable means to drain, and including spring means for moving the pump swashplate to neutral position when the valve member is in neutral, and spring means for taking up backlash in said linkage means and moving the valve member to neutral position when the handle is in neutral position.

7. In a variable displacement hydrostatic transmission including a pump with a pivotally mounted swashplate, a motor driven by the output of said pump, and fluid operable means for adjusting angular disposition of the swashplate in response to fluid flow through two separate conduits for varying pump displacement away from a neutral or minimum displacement position in two directions and return for reversible and variable transmission output, in combination a control lever selectively movable from a neutral position in either of two directions and return corresponding to the two directions of varying pump displacement, means providing a supply of fluid under pressure, valve means movable in two directions from a neutral position for directing fluid from said supply to respective ones of said two separate conduits to correspondingly vary pump displacement in two directions from neutral position, means linking said valve means and control lever for moving said valve means by said lever in each direction of movement of said lever toward and away from neutral position an amount sufficient to actuate said fluid operable means, and feedback means driven by said fluid operable means responsive to movement of said valve means by said handle in one direction for moving said valve means in the opposite direction for maintaining said displacement varying means in position an extent away from minimum displacement position corresponding with the extent of movement of said lever away from neutral position, said linking and feedback means includes a control rod linked to said lever, a control link pivotally mounted at three spaced positions to said swashplate, to one end of said control rod, and to said control valve respectively, the pivotal connection of said control rod being intermediate the pivotal connections of said swashplate and control means whereby retention of said intermediate pivotal connection immovable results in establishment of said intermediate pivot as a fulcrum for leverage movement of said control valve by said swashplate through said control link, the direction of initial movement of said control valve for moving said swashplate in one direction being the opposite direction from which the control valve is moved during leverage action of said swashplate on said control link about said intermediate pivot whereby movement of the swashplate in one direction by supply of fluid to one of said separate conduits through said control valve results in return of said control valve toward neutral position.

8. A combination as in claim 7 including a spring member linking said control rod to said lever for generally longitudinal movement of said control rod with pivotal movement of said lever in either direction from neutral position, said resilient spring being of sufficient strength to urge said control link about its point of pivotal attachment to said swashplate in either direction for linear movement of said control valve in either direction from neutral position responsive to movement of said lever in the corresponding direction from neutral position, said spring being of sufficient resilience to permit free additional movement of said lever beyond the point corresponding to the furthest movable extent of said control valve in either direction, said control valve in neutral position blocking communication between said source of high pressure fluid and both of said two separate conduit means.

9. In a variable displacement hydrostatic transmission including a pump with a pivotally mounted swashplate, a motor driven by the output of said pump, and fluid operable means for adjusting angular disposition of the swashplate in response to fluid flow through two separate conduits for varying pump displacement away from a neutral or minimum displacement position in two directions and return for reversible and variable transmission output, in combination a control lever selectively movable from a neutral position in either of two directions and return corresponding to the two directions of varying pump displacement, means providing a supply of fluid under pressure, valve means movable in two directions from a neutral position for directing fluid from said supply to respective ones of said two separate conduits to correspondingly vary pump displacement in two directions from neutral position, means linking said valve means and control lever for moving said valve means by said lever in each direction of movement of said lever toward and away from neutral position an amount sufficient to actuate said fluid operable means and, feedback means driven by said fluid operable means responsive to movement of said valve means by said handle in one direction for moving said valve means in the opposite direction for maintaining said displacement varying means in position an extent away from minimum displacement position corresponding with the extent of movement of said lever away from neutral position, spring means biasing said valve means to neutral position.

10. In a variable displacement hydrostatic transmission including a pump with a pivotally mounted swashplate, a motor driven by the output of said pump, and fluid operable means for adjusting angular disposition of the swashplate in response to fluid flow through two separate conduits for varying pump displacement away from a neutral or minimum displacement position in two directions and return for reversible and variable transmission output, in combination a control lever selectively movable from a neutral position in either of two directions and return corresponding to the two directions of varying pump displacement, means providing a supply of fluid under pressure, valve means movable in two directions from a neutral position for directing fluid from said supply to respective ones of said two separate conduits to correspondingly vary pump displacement in two directions from neutral position, means linking said valve means and control lever for moving said valve means by said lever in each direction of movement of said lever toward and away from neutral position an amount sufficient to actuate said fluid operable means, and feedback means driven by said fluid operable means responsive to movement of said valve means by said handle in one direction for moving said valve means in the oppoiste direction for maintaining said displacement varying means in position an extent away from minimum displacement position corresponding with the extent of movement of said lever away from neutral position, said valve means in neutral position connects both of said two separate conduits to drain and upon movement in opposite directions respectively connects one of said conduits to said fluid supply and the other to drain, and including spring means for normally maintaining the valve means in neutral position and capable of taking up backlash in said linking means to return the valve means to neutral when said control lever is in neutral, and spring means for moving the pump swashplate to neutral position when the valve means is in neutral position.

11. In a hydrostatic transmission, a pump having a swashplate, a motor, conduit means connecting the pump outlet with the motor inlet and the motor outlet with the pump inlet so that the pump delivers fluid to drive the motor and the motor returns fluid to the pump, double acting fluid operable means for varying the angle of the pump swashplate in opposite directions from a neutral center position thereby to vary the transmission output, valve means controlling the flow of fluid relative to the fluid operable means including a valve member movable in opposite directions from a neutral center position for porting fluid to operate the displacement varying means in opposite directions, a manual control handle for operating the valve means and movable in opposite directions from a neutral center position, linkage means interconnecting the manual handle and the valve member to move the valve member proportionately with handle movement, spring means for moving the valve member to neutral position when the handle is in neutral position thereby to port opposite sides of said fluid operable means to drain, and spring means for moving the pump swashplate to neutral when the valve member is in neutral position.

12. In a hydrostatic transmission, in combination, a variable displacement pump having a swashplate, a motor, conduit means connecting the pump outlet with the motor inlet and the motor outlet with the pump inlet so that the pump supplies fluid under pressure to drive the motor, hydraulic means for varying the displacement of one of the pump and the motor, means providing a source of control fluid under pressure, valve means controlling the flow of fluid to and from the displacement varying means including a valve member movable between a valve open position supplying control fluid under pressure from said source to said displacement varying means to adjust the latter and a valve closed position blocking the flow of fluid relative to the displacement varying means thereby to hold the latter at a selected displacement position, manually operable means for moving said valve member and means connected to said pump swashplate for signalling the position of said swashplate, said means including a link secured to the swashplate at one end, to the valve member at the other end, and to the manually operable means intermediate the ends so that selective positioning of said swashplate in response to movement of said valve member to said valve open position is directly communicated to said valve member to move said valve member toward a closed position when said swashplate has been moved to the preselected displacement position so that said swashplate will be held at said preselected displacement position in accordance with the original movement of said valve member.

13. In a hydrostatic transmission, in combination, a variable displacement pump having a swashplate, a motor, conduit means connecting the pump outlet with the motor inlet and the motor outlet with the pump inlet so that the pump supplies fluid under pressure to drive the motor, hydraulic means for varying the displacement of one of the pump and the motor, means providing a source of control fluid under pressure, valve means controlling the flow of fluid to and from the displacement varying means including a valve member movable between a valve open position supplying control fluid under pressure from said source to said displacement varying means to adjust the latter, a valve drain position for draining the fluid under pressure from the displacement varying means through drain conduit means to position the pump at minimum displacement and a valve closed position therebetween blocking communication between the displacement varying means and both said source and said drain conduit means for retaining the latter at a selected displacement position, spring means biasing the valve member toward said drain position, manually operable means for moving said valve member to open position and means connected to said swashplate and said valve member for signalling movement of said swashplate and for positioning said valve member in closed position in response to movement of the swashplate to a preselected displacement position thereby to retain the swashplate at said preselected displacement position.

14. In a hydrostatic transmission, a first variable displacement hydraulic unit, fluid operable means for varying the displacement of said hydraulic unit from a neutral position to vary the output from said hydraulic unit, a second hydraulic unit, conduit means interconnecting said first and second hydraulic units, valve means controlling the flow of fluid relative to the fluid operable means including a valve member movable in opposite directions for porting fluid to operate the displacement varying means; a manual control handle for operating the valve means and movable from a neutral position, linkage means interconnecting the manual handle and the valve member to move the valve member proportionately with handle movement, spring means engaging said valve member for moving the valve member to a neutral position when the handle is in neutral position thereby to render inoperative the valve means control on the fluid operable means, and separate spring means for moving the fluid operable means to neutral when the valve member is in neutral position.

15. In a hydrostatic transmission, a variable displacement hydraulic unit, fluid operable means for varying the displacement of the hydraulic unit to vary the output of said hydraulic unit, a second hydraulic unit, conduit means interconnecting said variable hydraulic unit and said second hydraulic unit, valve means controlling the flow of hydraulic fluid relative to said fluid operable means including a valve member movable in opposite directions to limit positions for porting fluid to operate the displacement varying means, a manual control handle for operating said valve means and movable from a neutral position, linkage means interconnecting the manual handle and said valve member to move the valve member proportionately with handle movement including normally rigid resilient means yieldable upon movement of said handle beyond a position sufficient to actuate said valve member to said limit positions, and spring means engaging said valve member for moving the valve member to a neutral position when the handle is in neutral position thereby to eliminate backlash in the linkage.

16. In a hydrostatic transmission as defined in claim 15, and further including stop means for engaging said valve member at said limit positions whereby said resilient means prevents damage to said valve means.

17. In a hydrostatic transmission, a pump having a swashplate, a motor, conduit means connecting the pump outlet with the motor inlet and the motor outlet with the pump inlet so that the pump delivers fluid to drive the motor and the motor returns fluid to the pump, double acting fluid operable means for varying the angle of the pump swashplate in opposite directions from a neutral center position thereby to vary the transmission output, valve means controlling the flow of fluid relative to the fluid operable means including a valve member movable in opposite directions from a neutral center position for porting fluid to operate the displacement varying means in opposite directions, a manual control handle for operating the valve means and movable in opposite directions from a neutral center position, linkage means interconnecting the manual handle and the valve member to move the valve member proportionately with handle movement; spring means for moving the valve member to neutral position when the handle is in neutral position thereby to port opposite sides of said fluid operable means to drain including a reduced stem portion on said valve member defining opposed shoulders, two collars slidably mounted on said reduced stem portion each engaging one of said shoulders, a coil spring mounted between said collars and resiliently biasing each of said collars against said shoulders when the valve member is in the neutral position, and stationary shoulders adjacent each of said collars adapted to engage the collars and compress the spring when the valve is moved in either direction from the neutral position to thereby bias the valve member to the neutral position; and spring means for moving the pump swashplate to neutral when the valve member is in neutral position.

18. In a hydrostatic transmission, in combination, an axial piston pump including a rotatable cylinder block, pistons reciprocable in said cylinder block, a swashplate pivotal about an axis interconnecting the cylinder block axis for reciprocating said pistons; a swashplate motor, conduit means connecting the pump outlet with the motor inlet and the motor outlet with the pump inlet so that the pump supplies fluid under pressure to drive the motor, fluid operable means for varying the displacement of said pump, means providing a supply of control fluid under pressure, valve means controlling the supply of fluid to and from the displacement varying means including a valve member movable between a valve open position supplying control fluid under pressure from said supply to said displacement varying means to adjust the latter and a valve center position wherein the displacement varying means is maintained inactive, manually operable means for opening said valve member a preselected amount corresponding to a desired swashplate displacement, and feedback means responsive to a fluid pressure moment acting on the swashplate for porting fluid to said displacement varying means to maintain the desired swashplate angle including link means pivotally connecting said swashplate to said valve member operable to move said valve member to said open position to supply fluid to said displacement varying means to increase the swashplate angle compensating for a decrease in swashplate angle caused by said fluid pressure moment.

19. In a variable displacement hydrostatic transmission including a pump with a pivotally mounted swashplate, a motor driven by said pump, and fluid operable means for adjusting angular disposition of the swashplate in response to fluid flow through two separate conduits for varying pump displacement away from a neutral or minimum displacement position in two directions and return for reversible and variable transmission output, in combination, a control lever selectively movable from a neutral position in either of two directions and return corresponding to the two directions of varying pump displacement, means providing a source of fluid under pressure, a valve member movable in two directions from a neutral position for directing fluid from said source to respective ones of said two separate conduits to correspondingly vary pump displacement in two directions from the neutral position, stop means defining opposite extremes of valve member movement and limiting movement of the valve member therebeyond, linkage means interconnecting said control lever and said valve member to move the valve member proportionately with handle movement including normally rigid resilient means yieldable upon movement of said handle beyond a position sufficient to engage the valve member with the stop means, feedback means driven by said fluid operable means responsive to movement of said valve member by said handle in one direction for moving said valve member in the opposite direction for maintaining said displacement varying means in a position corresponding with the extent of movement of said lever away from the neutral position, spring means for normally maintaining the valve member in the neutral position and capable of taking up backlash in said linkage means to return the valve member to neutral when said control lever is in neutral, and separate spring means for moving the pump swashplate to its neutral position when the valve member is in its neutral position.

20. In a variable displacement hydrostatic transmission including a pump with a pivotally mounted swashplate, a motor driven by said pump, and fluid operable means for adjusting angular disposition of the swashplate in response to fluid flow through two separate conduits for varying pump displacement away from a neutral or minimum displacement position in two directions and return for reversible and variable transmission output, in combination a control lever selectively movable from a neutral position in either of two directions and return corresponding to the two directions of varying pump displacement, means providing a source of fluid under pressure, a valve member movable in two directions from a neutral position for directing fluid from said source to respective ones of said two separate conduits to correspondingly vary pump displacement in two directions from the neutral position, stop means defining opposite extremes of valve member movement and limiting movement of the valve member therebeyond, linkage means interconnecting said control lever and said valve member to move the valve member proportionately with handle movement including normally rigid resilient means yieldable upon movement of said handle beyond a position sufficient to engage the valve member with the stop means, feedback means driven by said fluid operable means responsive to movement of said valve member by said handle in one direction for moving said valve member in the opposite direction for maintaining said displacement varying means in a position corresponding with the extent of movement of said lever away from the neutral position, and spring means for normally maintaining the valve member in the neutral position and capable of taking up backlash in said linkage means to return the valve member to neutral when said control lever is in neutral.

References Cited by the Examiner

UNITED STATES PATENTS

| | | | |
|---|---|---|---|
| 1,974,138 | 9/34 | Ferris | 60—52 X |
| 2,246,461 | 6/41 | Cannon. | |
| 2,280,190 | 4/42 | Ernst | 60—52 X |
| 2,381,795 | 8/45 | Willett | 60—53 |
| 3,054,263 | 9/62 | Budzich | 60—53 X |
| 3,127,745 | 4/64 | Young | 60—53 |

FOREIGN PATENTS 925,698    2/62    Great Britain.

JULIUS E. WEST, *Primary Examiner.*

EDGAR W. GEOGHEGAN, *Examiner.*